United States Patent [19]

Zupancic et al.

[11] Patent Number: 4,532,705
[45] Date of Patent: Aug. 6, 1985

[54] METHOD OF MAKING AN ELECTROCHEMICAL CELL HAVING A RESEALABLE VENT CLOSURE

[75] Inventors: Ronald L. Zupancic, Parma Heights; Lewis F. Urry, Columbia Station, both of Ohio

[73] Assignee: Union Carbide Corporation, Danbury, Conn.

[21] Appl. No.: 571,066

[22] Filed: Jan. 16, 1984

Related U.S. Application Data

[60] Continuation of Ser. No. 344,945, Feb. 2, 1982, abandoned, which is a division of Ser. No. 190,989, Sep. 26, 1980, Pat. No. 4,328,289.

[51] Int. Cl.$^3$ .............................................. H01M 2/12
[52] U.S. Cl. ..................................... 29/623.2; 220/362
[58] Field of Search ........................... 29/623.1, 623.2; 220/361–365, 373; 429/53–56, 82, 89, 196, 185

[56] References Cited

U.S. PATENT DOCUMENTS

| | | | |
|---|---|---|---|
| 3,398,026 | 8/1968 | Andre | 136/178 |
| 3,415,690 | 12/1968 | Richman | 136/178 |
| 3,664,878 | 5/1972 | Amthor | 136/178 |
| 4,032,696 | 6/1977 | Urry | 429/101 |
| 4,207,385 | 6/1980 | Hayama | 429/56 |
| 4,298,662 | 11/1981 | Sugalski et al. | 429/50 |

Primary Examiner—Charles F. LeFevour
Attorney, Agent, or Firm—Cornelius F. O'Brien

[57] ABSTRACT

A resealable vent closure for galvanic cells, such as non-aqueous oxyhalide cells, which comprises a castellated type of cap employed to compress and retain a resilient deformable member over a vent orifice in the cell's housing such that the compressed resilient deformable member will form a normally tight seal at the vent orifice which will vent and reseal after a predetermined pressure build up within the cell. The invention is also directed to a method for assembling an electrochemical cell, such as a nonaqueous oxyhalide cell, with the above-described resealable vent closure.

8 Claims, 7 Drawing Figures

METHOD OF MAKING AN ELECTROCHEMICAL CELL HAVING A RESEALABLE VENT CLOSURE

This application is a continuation of prior application Ser. No. 344,945, filed 2/2/82, now abandoned, which is a division of application Ser. No. 190,989, filed 9/26/80, now U.S. Pat. No. 4,328,289, patented 5/4/82.

FIELD OF THE INVENTION

This invention relates to a resealable vent closure for galvanic cells, such as nonaqueous cells, which comprises a castellated type of cap employed to compress and retain a resilient deformable member over a vent opening in the cell's cover such that the compressed resilient deformable member will form a normally tight seal at the vent opening. The invention also relates to a method for assembling a galvanic cell, such as a nonaqueous oxyhalide cell, with the resealable vent closure.

BACKGROUND OF THE INVENTION

Galvanic cells may generate large quantities of gas under certain conditions during use. Since many such cells are required to be tightly sealed in order to prevent loss of electrolyte by leakage, high internal gas pressures may develop. Such pressures may cause leakage, bulging or possible rupture of the cell container under abusive conditions, if not properly vented. If a vent valve is employed, it must be resealable in order to avoid drying out of the electrolyte over the life of the cell and to prevent ingress of oxygen and moisture from the atmosphere which can cause wasteful corrosion of the anode.

In the past, several different types of resealable pressure relief vent valves have been used for releasing high internal gas pressures from inside a sealed galvanic cell. One type of valve that has been commonly used consists basically of a valve member such as a flat rubber gasket which is biased into sealing position over a vent orifice by means of a resilient member such as a helical spring. The resilient member or spring is designed to yield at a certain predetermined internal gas pressure so as to momentarily break the seal and allow the gas to escape through the vent orifice.

In U.S. Pat. No. 3,664,878, to Author issued on May 23, 1972, a resealable vent is disclosed which comprises a resilient deformable ball of elastomeric material positioned to overlie a vent orifice provided within the cell's container. A retainer means is positioned over the resilient ball for maintaining the ball in place over the vent orifice and in contact with a valve seat provided around the peripheral edge portions of the vent orifice and for compressing and deforming the resilient ball into a flattened configuration forming a normally fluid-tight seal between the flattened ball and the valve seat. The resilient ball is capable of undergoing further temporary deformation upon the build up of a predetermined high internal gas pressure inside the container so as to momentarily break the seal and allow gas to escape through the vent orifice.

However, with the continuing development of portable electrically powered devices such as tape recorders and play-back machines, radio transmitters and receivers, and the like, a new type of reliable, long service life cells or batteries has been developed. These newly developed electrochemical cell systems provide a long service life by utilizing highly reactive anode materials such as lithium, sodium and the like, in conjunction with high energy density nonaqueous liquid cathode materials and a suitable salt.

It has recently been disclosed in the literature that certain materials are capable of acting both as an electrolyte carrier, i.e., as solvent for the electrolyte salt, and as the active cathode for a nonaqueous electrochemical cell. U.S. application Ser. No. 439,521 by G. E. Blomgren et al filed Feb. 4, 1974, which is a continuation-in-part of application Ser. No. 212,582 filed on Dec. 27, 1971, discloses a nonaqueous electrochemical cell comprising an anode, a cathode collector and a cathode-electrolyte, said cathode-electrolyte comprising a solution of an ionically-conductive solute dissolved in an active cathode depolarizer wherein said active cathode depolarizer comprises a liquid oxyhalide of an element of Group V or Group VI of the Periodic Table. The "Periodic Table" is the Periodic Table of Elements as set forth on the inside back cover of the Handbook of Chemistry and Physics, 48th Edition, the Chemical Rubber Co., Cleveland, Ohio, 1967–1968. For example, such nonaqueous cathode materials would include sulfuryl chloride, thionyl chloride, phosphorus oxychloride, thionyl bromide, chromyl chloride, vanadyl tribromide and selenium oxychloride.

Another class of liquid cathode materials would be the halides of an element of Group IV to Group VI of the Periodic Table. For example, such nonaqueous cathode materials would include sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride and tin tribromide chloride.

It has been found that when employing high energy density liquid cathode materials in nonaqueous cell systems, the cells exhibit higher voltage than cells employing conventional aqueous systems which results in fewer cell units being required to operate a particular battery-powered device. In addition, many of the oxyhalide and halide nonaqueous cells display relatively flat discharge voltage-versus-time curves. Thus these cells can be employed to produce batteries that will provide a working voltage closer to a designated cut-off voltage than is practicable with some conventional aqueous systems which generally do not exhibit flat discharge voltage-versus-time curves.

However, one possible disadvantage in the use of oxyhalide and halide liquid cathode nonaqueous cells is that it may be possible that during storage or use, some of the oxyhalide, halide or their reaction products may escape from the cell. This escape of liquids and/or gases could cause damage to the device employing the cell or to the surface of a compartment or shelf where the cell is stored. On the other hand, if the seal of the cell is effectively permanently secured, then it is possible that the build up of internal pressure within the cell could cause the cells container to rupture. To prevent rupture of the cell's container from possible internal pressure build up, it is thus necessary to vent the cell at some predetermined pressure. It has been reported that some oxyhalides such as thionyl chloride and sulfuryl chloride should be vented at pressures below about 500 psi and preferably between about 150 and 300 psi.

It is, therefore, an important object of this invention to provide a low pressure resealable vent closure for electrochemical cells, specifically oxyhalide cells.

It is another object of this invention to provide a low pressure resealable vent closure for small size cylindrical cells employing, for example, oxyhalides as the active cathodic material.

It is another object of this invention to provide a low pressure resealable vent closure for nonaqueous cells that is inexpensive to manufacture and easy to assemble.

It is another object of this invention to provide a method for assembling a low pressure resealable vent closure on electrochemical cells.

It is another object of this invention to provide a method for assembling the solid components of the cell in a container followed by closing the container with a cover and then adding the liquid components of the cell prior to assembling the low pressure resealable vent closure of this invention onto the cell's housing.

The foregoing and additional objects will become fully apparent from the following description and the accompanying drawings.

SUMMARY OF THE INVENTION

The invention relates to an electrochemical cell in which the active components of the cell are assembled within a housing comprising a container closed at its open end by a cover and having at least one vent orifice for releasing pressurized material from within the housing; the improvement being a resealable vent closure comprising in combination a resilient deformable member of an elastomeric material positioned to overlie said vent orifice, a retainer means for compressing said resilient deformable member against said vent orifice thereby forming a normally fluid-tight seal at said orifice, said retaining means comprising a cylindrical cap member surrounding said resilient deformable member and said vent orifice and being secured at one of its end to the housing and having at its opposite end a plurality of extending tabs, a retainer element, such as a disc, positioned within said cap member and disposed over and compressing said resilient deformable member over said vent orifice and whereby at least a numerical portion of said extending tabs is turned over the retainer element thereby securing said retainer element against said compressed resilient deformable member.

Preferably, a first numerical portion of the extending tabs are inwardly disposed parallel to the surface defining the vent orifice thereby providing an inward flange onto which the retainer element can seat after compressing the resilient deformable member. One benefit of this type of embodiment is that the flange can be adjusted to a height that will limit the compression of the resilient deformable member to a predetermined degree thus making this embodiment ideal for automatic assembly operation.

The invention also relates to a method for assembling an electrochemical cell having a low pressure resealable vent closure which comprises;
  (a) placing the solid components of a cell within the container of a cell's housing, said housing comprising the container being closed at its open end by a cover and said housing having at least one vent orifice;
  (b) feeding the liquid component of the cell through the vent orifice into the cell's housing;
  (c) placing a resilient deformable member of an elastomeric material over the vent orifice; and
  (d) compressing said resilient deformable member over the vent orifice to provide a fluid tight seal thereat and then securing said compressed resilient deformable member in the compressed state using a retainer means.

Preferably in the above-described method steps (c) and (d) could be performed as follows:
  (c') placing a resilient deformable member of an elastomeric material within a cylindrical retainer means being secured to the housing at one end and having tabs extending from the other end;
  (d') placing a retainer element such as a disc within said cylindrical retainer means and over the resilient deformable member and compressing said resilient deformable member via said retainer element thereby providing a fluid tight seal at said vent orifice; and
  (e) securing the retainer element against the compressed resilient deformable member by turning over the tabs of the cylindrical retainer means onto said retainer element.

More preferably, in the above-described method steps (c'), (d') and (e) could be performed as follows:
  (c") placing a resilient deformable member of an elastomeric material within a cylindrical retainer means and over the vent orifice, said cylindrical retainer means being secured to the housing at one end and having tabs extending from the other end with a first numerical portion of said tabs bent inwardly to provide a flange disposed such that a portion of the resilient deformable member extends above said flange;
  (d") placing a retainer element within said cylindrical retainer means and compressing said resilient deformable member until the retainer element seats on the inwardly disposed flange; and
  (e') securing the retainer element against the compressed resilient deformable member by turning over the remaining numerical portion of the tabs of the cylindrical retainer means onto said retainer element.

The resealable vent closure of this invention can be employed with all size cylindrical cells and is ideally suited for liquid cathode cell systems employing, for example, a liquid oxyhalide. In addition to providing an excellent and effective venting means, the invention also provides a method for initially assembling the solid components of a cell within a container that can be closed in a conventional manner before adding the cell's liquid component. When the cell's liquid component is an oxyhalide-based liquid cathode, such as thionyl chloride or sulfuryl chloride, then these corrosive liquids can be injected into the cell's housing through the small vent orifice, e.g., by vacuum filling, after the cell's cover is secured to the container. This will effectively eliminate corrosion of the crimping equipment used to close the cell as well as eliminating contamination at the interface(s) of the container and the cover by the oxyhalide.

In the broadest aspect of the invention, the resilient deformable material may be made from most any resilient elastomeric material. Preferably, however, in the case of a specific cell system the resilient deformable material should be made of a material that is chemically resistant to the cell's components, particularly the cell's liquid components. For nonaqueous oxyhalide cell systems such as thionyl chloride and sulfuryl chloride, the resilient deformable material could be Kalrez, which is a trade name for a type FFKM perfluoroelastomer manufactured by du Pont.

Preferably a thin chemically inert element, such as a disc, could be placed between the resilient deformable material and the vent orifice or the resilient deformable material could be covered with a chemically inert member. With these types of embodiments, the resilient deformable member could be selected from a wide variety of resilient elastomeric materials such as rubbers and thermoplastics.

A cell for use in the invention can be the split internal anode/outer cathode collector construction as described in U.S. Pat. No. 4,032,696 or the split internal cathode collector construction as described in U.S. Pat. No. 4,048,398, said U.S. Pat. Nos. 4,032,696 and 4,048,389 being incorporated herein by reference.

Suitable nonaqueous liquid cathode materials for use in cells of this invention could be one or more of the liquid oxyhalides of an element of Group V or Group VI of the Periodic Table and/or one or more of the halides of an element of Group IV to Group VI of the Periodic Table, said Periodic Table being the Periodic Table of Elements as set forth on the inside back cover of the Handbook of Chemistry and Physics, 48th Edition, The Chemical Rubber Co., Cleveland, Ohio, 1967-1968. For example, such nonaqueous cathode materials would include sulfuryl chloride, thionyl chloride, phosphorus oxychloride, thionyl bromide, chromyl chloride, vanadyl tribromide, selenium oxychloride, sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride and tin tribromide chloride. Another suitable cathode material could be liquid sulfur dioxide.

Anodes suitable for use in nonaqueous liquid cathode cell systems can be generally comsumable metals and include the alkali metals, alkaline earth metals and alloys of alkali metals or alkaline earth metals with each other and other metals. The term "alloy" as used herein is intended to include mixtures; solid solutions such as lithium-magnesium; and intermetallic compounds such as lithium monoaluminide. The preferred anode materials are the alkali metals and particularly lithium, sodium and potassium. When using lithium anodes the anode may be coated with a vinyl resin as disclosed in U.S. Pat. No. 3,993,501, said patent incorporated herein by reference.

The cathode collector for use in liquid cathode cell systems has to be electronically conductive so as to permit external electrical contact to be made with the active cathode material and also provide extended area reaction sites for the cathodic electrochemical process of the cell. Materials suitable for use as a cathode collector are carbon materials and metals such as nickel, with acetylene black being preferably. In addition, the cathode collector when made of a particulate material should be capable of being molded directly within a can or capable of being molded into various size discrete bodies that can be handled without cracking or breaking. To impart a cohesive characteristic to some types of cathode collectors, such as carbonaceous cathode collectors, a suitable binder material, with or without plasticizers and with or without stabilizers, can be added to the cathode collector materials. Suitable binder materials for this purpose may include vinyl polymers, polyethylene, polypropylene, polyacrylics, polystyrene and the like. For example, polytetrafluoroethylene would be the preferred binder for cathode collectors for use with liquid oxyhalide cathodes. The binder, if required, should be added in an amount between about 5% and about 30% by weight of the molded cathode collector since an amount less than 5% would not provide sufficient strength to the molded body while an amount larger than 30% would wetproof the surface of the carbon and/or reduce the available surface of the carbon, thereby reducing the activation site areas required for the cathodic electrochemical process of the cell. Preferably, the binder should be between 10% and 25% by weight of the cathode collector. Of importance in selecting the materials for the cathode collector is to select materials that will be chemically stable in the cell system in which they are to be used.

A solute for use in liquid cathode cell systems may be a simple or double salt which will produce an ionically conductive solution when dissolved in a suitable solvent. Preferred solutes for nonaqueous systems are complexes of inorganic or organic Lewis acids and inorganic ionizable salts. The only requirements for utility are that the salt, whether simple or complex, be compatible with the solvent being employed and that it yield a solution which is ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226, July/December, 1938, pages 292-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in conjunction with liquid oxyhalide cathodes include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide lithium sulfide, sodium fluoride, sodium chloride, sodium bromide, potassium fluoride, potassium chloride and potassium bromide.

It will be obvious to those skilled in the art that the double salts formed by a Lewis acid and an ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride.

If desired, and specifically for the halides, a cosolvent should be added to the liquid active reducible cathode and solute solution to alter the dielectric constant, viscosity or solvent properties of the solution to achieve better conductivity. Some examples of suitable cosolvents are nitrobenzene, tetrahydrofuran, 1,3-dioxolane, 3-methyl-2-oxazolidone, propylene carbonate, γ-butyro-lactone, sulfolane, ethylene glycol sulfite, dimethyl sulfite, benzoyl chloride, dimethoxyethane, dimethyl isoxazole, diethyl carbonate, sulfur dioxide and the like.

Suitable separators for use with liquid cathodes in nonaqueous cells are the nonwoven glass separators, preferably those separators that incorporate long glass fibers along with the short glass fibers since such a combination increases the tear strength of the separators thereby making them easier to handle.

The container of the cell could be made of stainless steel, iron, nickel, plastic, coated metals or some other suitable material.

Some preferred combinations of nonaqueous cathode materials and anode would be as follows:

(1) sulfuryl chloride/Li or Na;
(2) thionyl chloride/Li or Na;
(3) phosphorus oxychloride/Li or Na;
(4) sulfur monochloride/Li or Na;
(5) sulfur monobromide/Li or Na;
(6) selenium tetrafluoride/Li or Na;

Preferably, the cells for use in this invention would be liquid oxyhalide cells using sulfuryl chloride, thionyl chloride or mixtures thereof with a lithium anode.

It is to be understood that the resealable vent closure of this invention could be used in other cells systems such as, for example, Leclanche dry cells, zinc chloride cells, lithium-$MnO_2$ cells, lithium-iron sulfide cells, alkaline $MnO_2$ cells, nickel-cadmium cells and lead-acid cells.

The present invention will become more apparent from the following description thereof when considered together with the accompanying drawing which is set forth as being exemplary of embodiments of the present invention and is not intended in any way to be limitative thereof and wherein.

Figure 1:
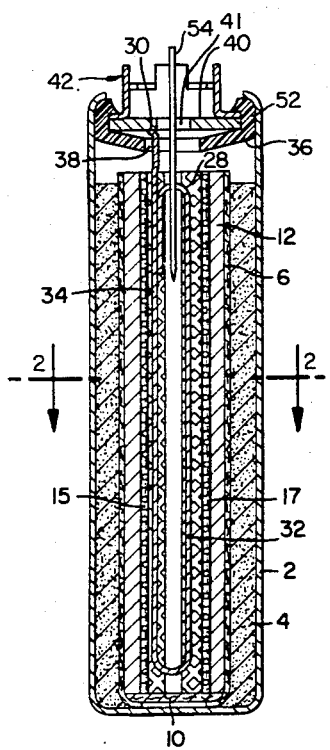
FIG. 1 is a vertical cross sectional view of an electrochemical cell having its solid components fully assembled within a housing and being ready for receiving the liquid component of the cell.

Referring in detail to FIG. 1, there is shown a cross sectional view of a cylindrical cell comprising a cylindrical container 2 having disposed therein a cathode collector shell 4 in contact with the inner upstanding circumference of the container 2 thereby adapting the container as the cathodic or positive terminal for the cell. Disposed within and in contact with the inner circumference of cathode collector 4 is a separator liner 6 with its bottom separator or disc 10. If desired, the cathode collector material could be extruded within the container 2, rolled with the container material or composed of one or more segments to form a cylindrical tube and then placed in the can.

Figure 2:
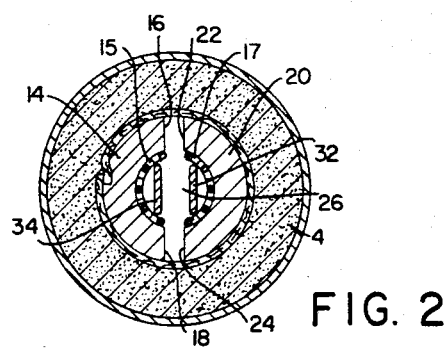
FIG. 2 is an enlarged horizontal cross sectional view taken along line 2—2 of FIG. 1.

A two member anode 12 is shown in FIGS. 1 and 2 comprising a first half cylindrical annular member 14 having flat end faces 16 and 18 and a second half cylindrical annular member 20 having flat end faces 22 and 24. When the flat end faces of each cylindrical half member are arranged in an opposing fashion as shown in FIGS. 1 and 2, an axial cavity 26 is defined between the cylindrical half annular members 14 and 20.

If desired, arcuate type backing sheets 15 and 17, such as inert electrically conductive metal screens or grids, could be disposed against the inner surface wall of the anode bodies 14 and 20, respectively, to provide uniform current distribution over the anode. This will result in a substantially uniform consumption or utilization of the anode while also providing a substantially uniform spring pressure over the inner wall surface of the anode as will be discussed below.

An electrically conductive spring strip 28 is appropriately bent into a flattened elliptically shaped member having an extending end 30. When inserting the spring strip 28 into a container, the legs 32, 34 of the conductive strip 28 are squeezed together and forced into the axial opening between the two screen-backed anode members arranged in a container as shown in FIGS. 1 and 2. The inserted conductive spring strip 28 resiliently biases the two anode members 14 and 20 via backing screens 15 and 17 so as to provide a substantially uniform and continuous pressure contact over the inner wall of the anode members. The extended end 30 of spring strip 28 is shown projected above the surface of anode members 14 and 20. An insulating gasket 36 has a central opening 38 through which the projected end 30 of the spring strip 28 passes, whereupon the end 30 is then welded to cover 40 thereby adapting the cover 40 as the anodic or negative terminal of the cell.

Figure 3:
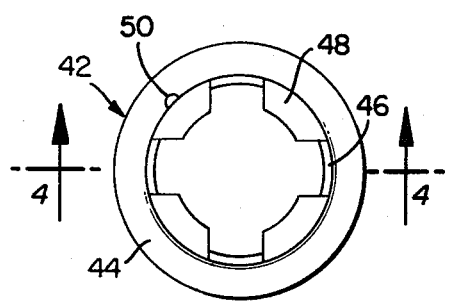
FIG. 3 is a top view of a castellated cap or use in the cell shown in FIG. 1.
Figure 4:
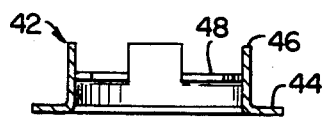
FIG. 4 is a horizontal cross sectional view of the castellated cap taken along line 4—4 of FIG. 3.

Secured to the cover 40 is a castellated cap 42 which is shown in detail in FIGS. 3 and 4. Specifically, the castellated cap 42 comprises a cylindrical segment terminating at one end with an outwardly oriented flange 44 and extending at the other end a plurality of tabs 46 projecting upward and having an inwardly projected plurality of tabs 48 forming an inwardly disposed flange. Disposed at the horizontal flange 44 is a vent opening 50 for venting gases from within the cell.

The insulating gasket 36 has a peripheral depending skirt 52 disposed between the cover 40 and the upper inner wall of container 2 for closing the cell through conventional crimping techniques. As shown in FIG. 1, the castellated cap 42 is secured to the cover 40 and the cell is closed using conventional crimping techniques with all of the solid components of the cell assembled within the container 2. After the cell is assembled with the solid components, a hypodermic needle 54 or the like is used to inject the liquid component into the assembled cell. Specifically, a cathode-electrolyte comprising a suitable salt dissolved in an oxyhalide, a halide with a cosolvent, or mixtures thereof, can be dispensed through orifice 41, in cover 40 and into cavity 26, using he hypodermic needle 54, whereupon it can penetrate through the separator and cathode collector of the cell.

Figure 5:
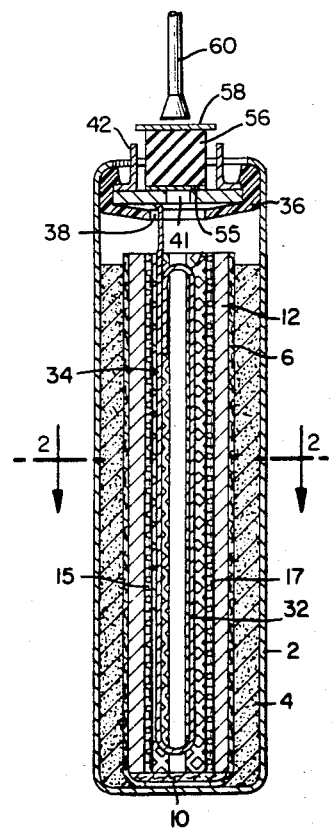
FIG. 5 is a vertical cross sectional view of the cell of FIG. 1 after the additional of the liquid component and just prior to sealing the resealable vent closure of the cell.

As shown in FIG. 5, after the cell's liquid component is fed into the container, a Teflon disc 44 (optional) is disposed over orifice 41 of cover 40 and then a resilient deformable member 56 is placed over the disc 55. If desired, the disc 55 could be eliminated and the resilient deformable member 56 could be at least partially encased with a member chemically inert to the cell environment, thus expanding the materials that could be used as the resilient member. In this type embodiment, at least the area of the resilient deformable member that overlies the vent opening has to be encased with e.g., coated or otherwise having a layer of, the chemically inert member so as to protect the resilient deformable member from the cell's active components. An alternate embodiment will comprise the placing of a member, preferably a chemically inert member, adhesively secured over the vent orifice 41 prior to the addition of the liquid component. Thereafter, the liquid component can be added by piercing with a hypodermic needle or removing the chemically inert member and injecting the liquid component into the cell, followed by the assembly of the deformable member as will be discussed below. The advantage of this embodiment is that the cells can be handled and stored in various environments prior to the addition of the liquid component.

Figure 7:
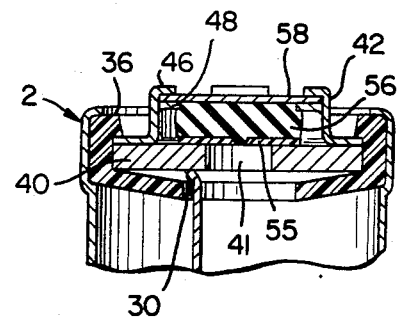
FIG. 7 is a partial vertical cross sectional view of the fully assembled cell taken along line 7—7 of FIG. 6.

As also shown in FIG. 5, a second disc 58 which could be made of metal or plastic is place on top of the resilient member 56 and then a conventional plunger 60 is used to compress the deformable member 56 via disc 58. As shown in FIG. 7, plunger 60 compresses deformable member 56 until disc 58 rests upon inwardly projected flange 48 of the castellated cap 42. Thereafter the upstanding tabs 46 are turned over disc 58 producing a fully assembled cell having secured at its top a resealable vent closure comprising the castellated top 42, deformable member 56 and discs 55 and 58.

Figure 6:
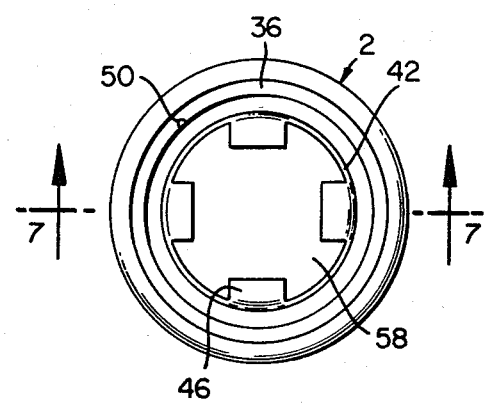
FIG. 6 is a top view of a fully assembled electrochemical cell employing the resealable vent closure of this invention.

FIG. 6 shows the top view of the fully assembled cell with the novel resealable vent closure of the invention and FIG. 7 shows a partial cross sectional view of the fully assembled cell. Specifically as shown in FIG. 7, the deformable member 56 is compressed over orifice 41 in the cover, thereby providing a liquid tight seal thereat. As also shown in FIG. 7, disc 58 rests on flange 48 and is then secured with the turned over tabs 46 of the castellated cap 42. In the operational mode of the resealable vent closure, any gas buildup within the cell will exert pressure against disc 55 thereby further compressing deformable member 56 thus permitting gas to escape through orifice 41 and the interface of disc 55 and cover 40 whereupon it will then escape through vent opening 50 as shown in FIGS. 3 and 6. It should be understood that disc 55 is not necessary and deformable member 56 could be placed directly over the orifice 41 in the cover 40 and provide the same type of resealable closure means as discussed above.

It is also possible to employ a castellated cap for use in this invention without the inwardly disposed flange 48 whereupon the deformable member could be compressed to any desirable height as determined by there force of the plunger mechanism.

Preferably prior to the adding of the liquid component of the cell, a vacuum could be created within the cell whereupon the liquid component could then be drawn effectively into the cell and uniformly distributed therein.

An advantage in the use of the resealable vent closure of this invention is that the cell will permit normal venting of gases under low pressure and at the same time, due to its construction, will permit the venting of rapidly generated internal pressure which would be sufficient in force to push the deformable member and disc free of the cell. Thus the resealable vent closure of this invention will be sufficient to vent the cell upon normal pressure build up and at the same time provide a means for venting rapidly generated high pressure build up without rupturing of the cell's container.

The following examples are illustrative of the present invention and are not intended in any manner to be limitative thereof.

EXAMPLE 1

Several cells were made in accordance with FIGS. 1 to 7 using the following components:
anode of lithium
cathode collector of Teflon-bonded acetylene black
thionyl chloride containing 1.5M $LiAlCl_4$.
Each cell measured 0.475 inch diameter and was 1.63 inches long.

Several of the above-described cells were heated in a direct flame. A thermocouple was used to measure the temperature of the cell and upon reaching a level of 300° F., all of the cells showed some bottom bulge without any of the cells rupturing. Contrary to this, cells using the above-identified components and sealed in a conventional manner would generally show some container rupture when subjected to the same test conditions.

EXAMPLE 2

Several cells were constructed using the same components as in Example 1 and employing the resealable vent closure of this invention. The cells were charged at 0.5 ampere for 30 minutes at room temperature. All of the cells vented and none of the containers ruptured.

What is claimed is:

1. A method for assembling an electrochemical cell comprising a solid component and a liquid component with a low pressure resealable vent closure which method comprises:
    (a) placing the solid component of a cell within a container having an open end, said container having secured to said open end a cover, said cover having a vent orifice;
    (b) securing a hollow retainer means to the cover such that said hollow retainer means surrounds the vent orifice, said retainer means having an open outer end having tabs extending therefrom;
    (c) feeding the liquid component of the cell through the vent orifice into the container;
    (d) placing a resilient deformable member of an elastomeric material within said hollow retainer means and over the vent orifice;
    (e) placing a retainer element within said hollow retainer means and over the resilient deformable member;
    (f) compressing said resilient deformable member over said vent orifice thereby providing a fluid tight seal at said vent orifice; and
    (g) securing the retainer element against the compressed resilient deformable member by turning over the tabs of the outer end of the hollow retainer means onto said retainer element.

2. The method of claim 1 wherein the liquid component of the electrochemical cell fed into the cell in step (c) is a cathode-electrolyte which comprises at least one liquid oxyhalide selected from the group consisting of thionyl chloride, sulfuryl chloride, phosphorous oxychloride, thionyl bromide, chromyl chloride, vanadyl tribromide and selenium oxychloride.

3. The method of claim 2 wherein the electrochemical cell employs a solid anode selected from the group consisting of lithium, sodium, calcium, potassium and aluminum.

4. The method of claim 1 wherein the hollow retainer means secured in step (b) is cylindrical.

5. A method for assembling an electrochemical cell comprising a solid component and a liquid component and having a low pressure resealable vent closure which method comprises the steps;

(a) providing a cell container having an open end, a closed end and an upstanding wall;

(b) inserting a cathode collector shell into said container, said cathode collector shell being in contact with the upstanding wall of the container thereby adapting the container as the positive terminal of the cell, said cathode collector shell having an inner wall defining an axial space therethrough;

(c) disposing a separator within the axial space defined by the inner wall of the cathode collector shell and in contact with said inner wall of the cathode collector shell such that said separator has an inner wall defining an axial opening;

(d) inserting within the axial opening defined by the inner wall of the separator a multimember anode comprised of a first half-cylindrical annular member having a screen-backed inner surface wall and a second half-cylindrical annular member having a screen-backed inner surface wall, said first and second cylindrical half annular members being disposed in an opposing fashion to form a cylindrical member with the screen-backed inner walls defining an axial cavity therethrough;

(e) disposing an electrically conductive spring strip into the axial cavity defined by the screen-backed inner walls of the anode members such that said strip contacts the screen-backed inner wall thereby resiliently biasing the two anode members against the separator;

(f) securing a cover over the open end of said container, said cover having a vent orifice;

(g) securing a hollow retainer means to the cover such that said hollow retainer means surrounds the vent orifice, said retainer means having an open outer end having tabs extending therefrom;

(h) feeding the liquid component of the cell through the vent orifice into the container;

(i) placing a resilient deformable member of an elastomeric material within said hollow retainer means and over the vent orifice;

(j) placing a retainer element within said hollow retainer means and over the resilient deformable member and compressing said deformable member over the vent orifice so as to provide a fluid-tight seal at said vent orifice; and (k) securing the retainer element against the compressed resilient deformable member by turning over the tabs of the retainer means onto said retainer element.

6. The method of claim 5 wherein the liquid component of the electrochemical cell in step (h) is a cathode-electrolyte which comprises at least one liquid oxyhalide selected from the group consisting of thionyl chloride, sulfuryl chloride, phosphorous oxychloride, thionyl bromide, chromyl chloride, vanadyl tribromide and selenium oxychloride.

7. The method of claim 6 wherein the electrochemical cell employs a solid anode selected from the group consisting of lithium, sodium, calcium, potassium and aluminum.

8. The method of claim 5 wherein the hollow retainer means secured in step (g) is cylindrical.

* * * * *